United States Patent Office 3,619,911
Patented Nov. 16, 1971

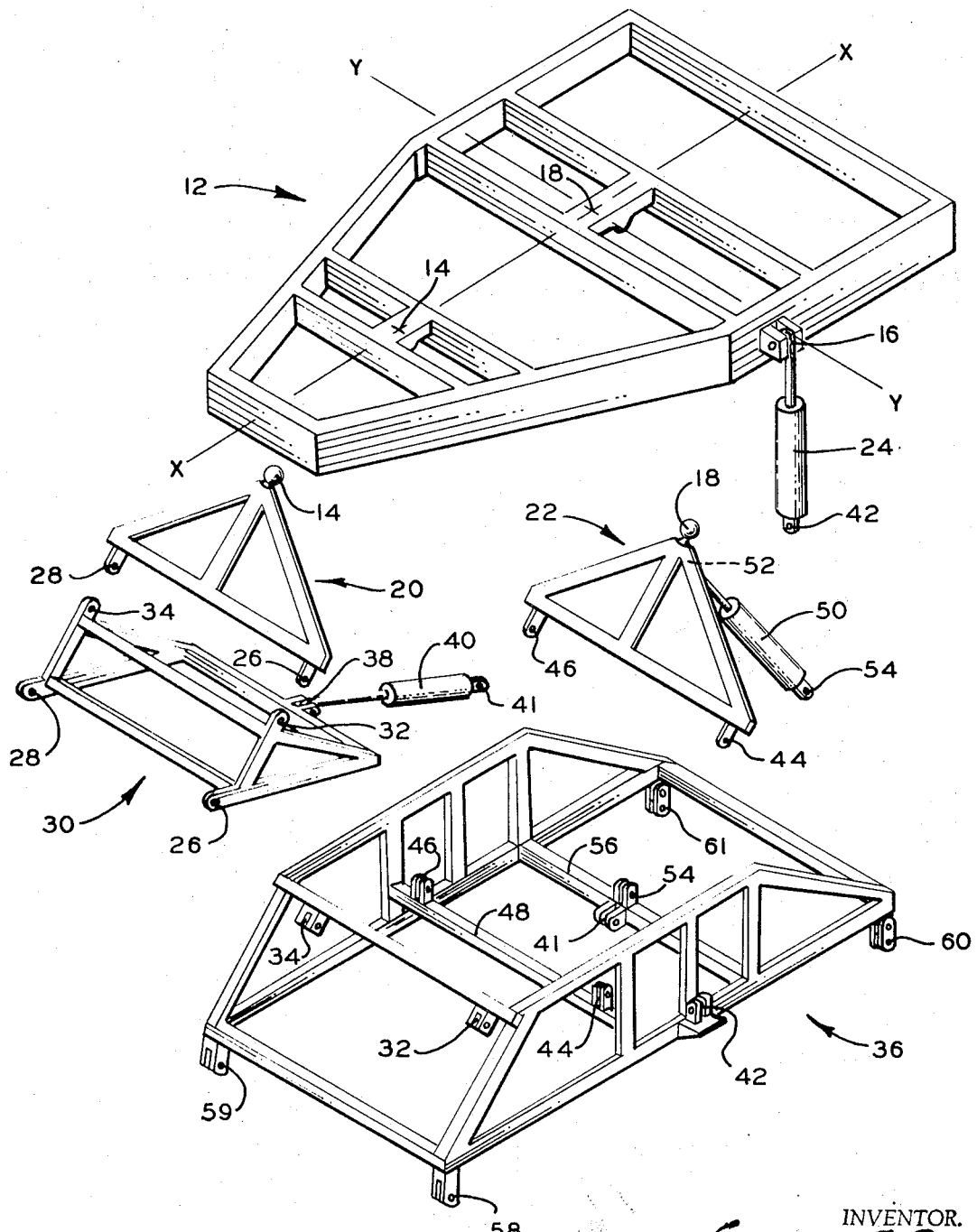

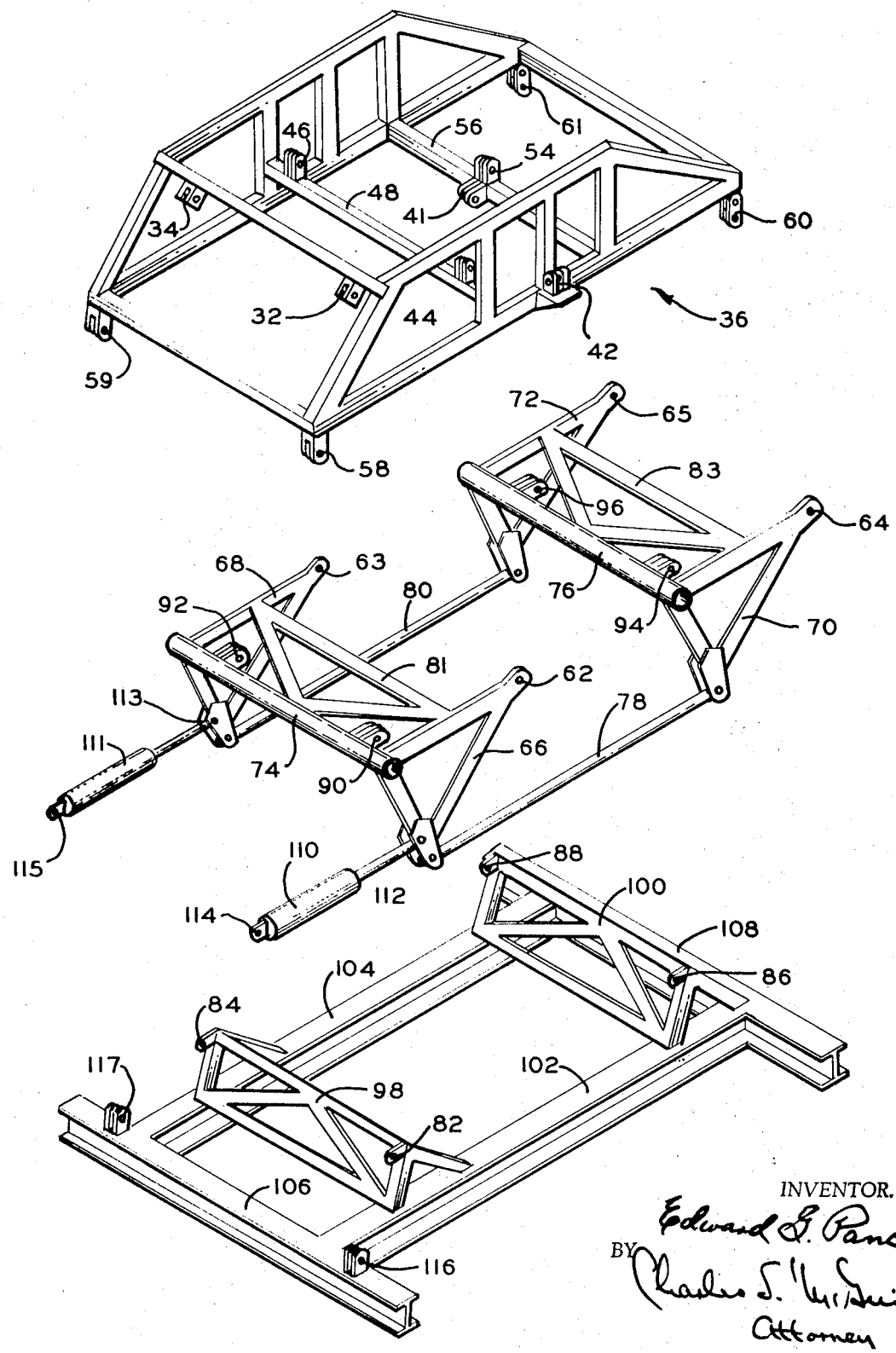

3,619,911
MOTION SYSTEM
Edward G. Pancoe, Chenango Forks, N.Y., assignor to
Singer-General Precision, Inc., Binghamton, N.Y.
Filed May 19, 1969, Ser. No. 825,527
Int. Cl. G09b 9/08
U.S. Cl. 35—12 P
4 Claims

ABSTRACT OF THE DISCLOSURE

A motion system for an aircraft simulator, or the like, of the type wherein independent actuators are provided for moving the motion platform in each single axis of freedom. The present invention provides such a system with greatly improved structural rigidity and exact duplication of motion transmitted through a linkage at a number of points. In the disclosed embodiment, vertical translation is imparted by rotating four bell crank members linked to four respective corners of a truss, the bell cranks being connected in a structurally closed-loop manner to eliminate backlash or lost motion in the linkage.

---

The present invention relates to motion simulators of the type commonly utilized to provide controlled movement within specified limits to a rigid platform which may carry the student station of a vehicle simulator, or the like.

Vehicle simulator training apparatus in current use normally includes a system for providing to the student station controlled velocities and accelerations representative of the type likely to be encountered in operation of the actual vehicle. The training value derived from the simulator is thereby greatly enhanced by duplicating to some extent the sensory stimuli experienced in an actual vehicle of the type simulated. Motion is commonly provided to the student station by controlled actuation of rigid elements, such as linear actuators and the like. Such systems may be generally classified as being either of the synergistic type, wherein the movement of all actuators is required to produce movement of the student station in any one axis of freedom, or of the cascaded or independent type, wherein only one actuator need be moved to provide motion in any single axis of freedom. These two types of motion systems each have certain advantages and disadvantages, the selection of one type or the other depending upon the desired performance and physical design limitations placed on the system.

The present invention is concerned with motion systems of the independent type having a plurality of motion actuators, each providing movement of the student station in or about a distinct axis of freedom. Movement of the several actuators may be superimposed (i.e., effected simultaneously) to produce more complex motions in more than one degree of freedom at any given time. The principal object of the invention is to provide a motion simulator of the independent type incorporating the usual advantages of such type of motion system while overcoming certain disadvantages and providing advantages normally associated with synergistic motion simulators. Extension and retraction movements of the actuators are transmitted to the student station, commonly supported on a rigid motion platform, through appropriate mechanical linkages in some cases, and through direct connection between the actuator and platform in others. It is desirable, of course, that the design of the linkages be such that minimal backlash or lost motion occurs during operation of the motion system. Also, the linkage should be as stable as possible; that is, the linkage must be restrained against movement in any other than the desired direction, either translational or rotational. Some linkages further require means for insuring exact duplication of motion transmission from side to side, or front to rear, of a truss, platform, or other such element supported at several points.

The present invention is directed toward providing a motion simulator having an improved linkage with the desirable features enumerated above. In the disclosed embodiment, vertical translation is imparted to the motion platform through an arrangement of four bell cranks linked to the four corners of a truss. This would normally introduce an unduly large amount of backlash into the system and an accompanying disparity in the amount of motion transmitted to each corner of the truss. However, through the use of a unique, closed-loop structure, rotation of each bell crank is identically duplicated by each of the others and a system is provided with great fidelity of motion transmission as well as superior stability with reasonable simplicity and economy, which is the principal object of the invention.

Other objects of the invention will in part be obvious and will in part appear hereinafter.

The invention accordingly comprises the features of construction, combinations of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIGS. 4 and 5 are exploded perspective views of selected elements of the apparatus shown in FIGS. 1–3.

Prior art motion systems of the synergistic type are typified by the motion simulator shown in U.S. Pat. No. 3,295,224, and those of the independent or cascaded type by U.S. Pats. Nos. 2,930,144 and 3,281,962, among others. Motion simulators of both types are commonly provided as an integral portion of many aircraft flight simulators, and similar training apparatus, and operate with the motion actuators under the control of appropriate analog or digital computer means. The present invention is likewise intended to be operated with linear actuators which may be identical in construction and operation with those disclosed in prior publications, such as the patents mentioned above. Therefore, in the interest of clarity and brevity the present disclosure will be limited to the mechanical configuration with which the invention is primarily concerned, it being understood that appropriate servomechanisms, follow-up devices, computer hardware and software, and other such operational elements may be provided in accordance with prior art teachings.

Figure 1:
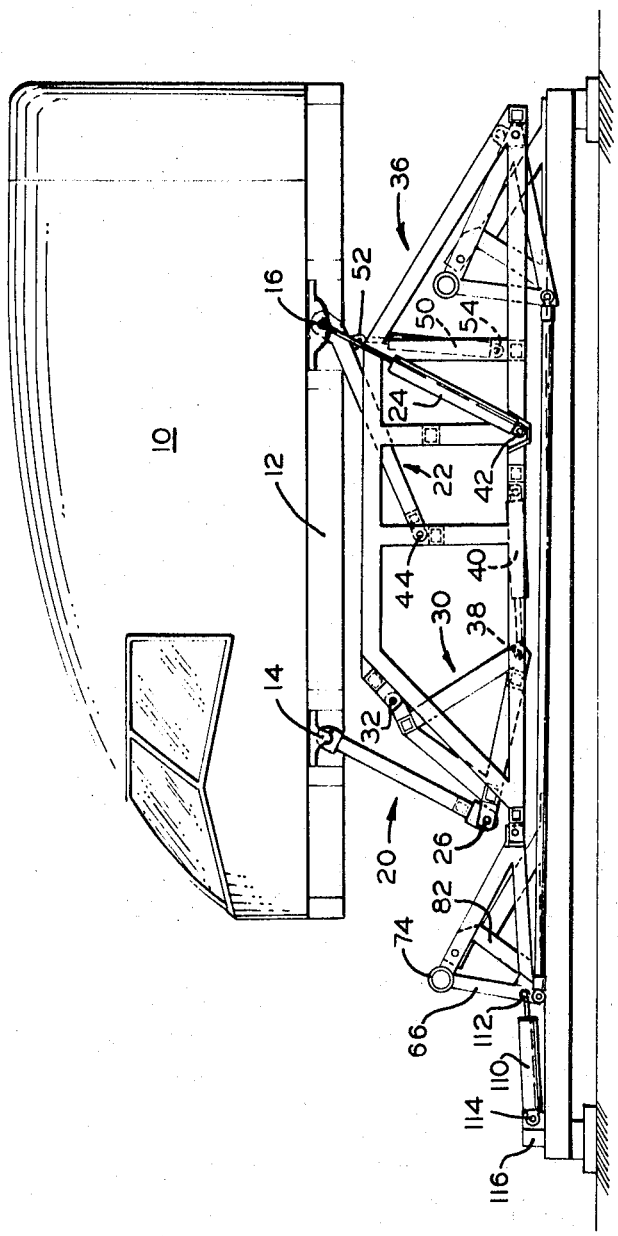
FIG. 1 is a side elevational view showing an exemplary form of the invention with the apparatus in a rest or settled position.

A typical flight simulator cockpit of the type intended to provide the student station of the motion simulator is shown in FIG. 1 and indicated by the reference numeral 10. Cockpit 10 is fixedly secured to rigid platform 12 through which motions are transmitted to the student station. Platform 12 is supported at three points by means of suitable joints, such as ball and socket or two axis gimbal joints, connecting the platform to other rigid elements. The three points of support of platform 12 are best seen in FIG. 4, where they are indicated by the reference numerals 14, 16 and 18. Point 14 lies on the longitudinal axis of the platform, indicated by the line X—X, point 16 lies on a transverse axis, indicated by the line Y—Y, and point 18 lies at the intersection of the two axes. The common designations "roll" and "pitch" will be used hereinafter to refer to movements of platform 12 about the X and Y axes, respectively, and to describe elements used to produce such motions.

The platform is supported at points 14 and 18 by A-frame structures, indicated generally by the reference numerals 20 and 22, and at point 16 by the movable end portion of the piston rod of hydraulic cylinder 24, comprising a portion of the linear actuator system by which roll motion of platform 12 is implemented. A-frame 20 extends from its connection at point 14 (indicated in FIG. 4 both on the platform and the A-frame) with platform 12 to a pair of pivoted connections 26 and 28 with transfer truss 30. A-frame 20 and truss 30 form a mechanical linkage through which pitch motion is transmitted to platform 12. Truss 30 is pivotally connected at points 32 and 34 to vertical translation truss 36, and is further pivotally attached at point 38 to the end of the piston rod of pitch cylinder 40, the other end of which is pivotally attached at 41 to a support on truss 36. Roll cylinder 24 is likewise pivotally supported at point 42 upon vertical translation truss 36.

A-frame 22 extends from its connection at point 18 (also indicated on both the platform and the A-frame) with platform 12 to a pair of pivotal connections 44 and 46 upon horizontal member 48 of vertical translation truss 36. Extensible cylinder 50 is attached at one end to A-frame 22 at point 52 and at the other end at point 54 to horizontal member 56 of vertical translation truss 36. Although roll cylinder 24 and pitch cylinder 40 are programmed, servoed actuators which produce controlled motion of platform 12 about axes X—X and Y—Y, respectively, extensible cylinder 50 is used merely for moving the support point 18 between two positions, as will be more fully explained hereinafter. In one such position (FIG. 1) platform 12 is in a rest position with the power to all actuators turned off, and in the other (FIG. 2) the platform is in an operative position for movement under control of the actuators. Thus, there is no necessity for any control of the rate of movement of cylinder 50 which, in the proper sense, is not a motion actuator.

The mechanism by which vertical translation is imparted to platform 12 is shown in greater detail in FIG. 5. Vertical translation truss 36 is pivotally connected adjacent each of its four corners indicated by reference numbers 58, 59, 60 and 61, to respective points 62, 63, 64 and 65 on each of four rigid, triangular bell crank members 66, 68, 70 and 72, respectively. While the bell cranks may be attached to fixed mountings at two of the corners (e.g., 58 and 59) of truss 36, mountings allowing some movement to compensate for slight fore-and-aft misalignment should be used at the other two corners (e.g., the shackle mountings shown at 60 and 61). The two forward bell cranks 66 and 68 are rigidly connected by torsion tube 74 and the two rear bell cranks 70 and 72 are connected by torsion tube 76. The torsion tubes are rigidly connected, e.g., by welding, to each of the bell cranks which they connect, whereby rotational movement of the bell cranks on either side is transmitted precisely to the corresponding bell crank on the opposite side. Also, the forward and rear bell cranks 66 and 70 one side of the apparatus are tied together by tension rod 78 which is pivotally attached at its opposite ends to portions of the bell cranks. Likewise, bell cranks 68 and 72 on the opposite side of the apparatus are tied together by tension rod 80 in the same manner. Truss structures 81 and 83 provide lateral rigidity between the front and rear pairs of bell cranks, respectively. The four bell cranks are pivotally mounted upon fixed supports 82, 84, 86 and 88 by means of fixed brackets 90 and 92 on torsion tube 74 and fixed brackets 94 and 96 on torsion tube 76. Forward fixed supports 82 and 84 are connected by rigid truss structure 98, and rear fixed supports 86 and 88 are connected by truss structure 100. The fixed supports may be attached to the floor to other suitable base support structure such as longitudinally extending I-beams 102 and 104, and laterally extending I-beams 106 and 108. Vertical translation cylinders 110 and 111 have their movable ends pivotally secured at 112 and 113 to bell cranks 66 and 68, respectively, and are pivotally attached at the other ends 114 and 115 to fixed mountings 116 and 117 on I-beam 106. It will be noted that although torsion tubes 74 and 76 enhance the structural rigidity they do not add to the weight which must be lifted in order to elevate platform 12 since they move downwardly as the platform is elevated.

The structure thus far disclosed is suitable for providing motion in three degrees of freedom to platform 12, and therefore to student station 10. As shown in FIG. 1, platform 12 is in the rest or settled position with cylinders 24, 40 and 110 in their fully retracted positions. Likewise, erecting cylinder 50 is in its fully retracted position and platform 12, due to the geometric relationships of the cylinders and other structural elements, is in a level position wherein power to the actuators may be turned off. Simultaneous extension of erecting cylinder 50, and pitch and roll cylinders 40 and 24 will move platform 12 to the position shown in FIGS. 2 and 3. In this position, erecting cylinder 50 is fully extended, but the pitch and roll cylinders are extended only to such an extent that they are capable of producing motion of platform 12 to the desired extent in both directions about each of axes X—X and Y—Y. In moving from the settled to the erected position, extension of cylinder 50 is transmitted through A-frame 22 to elevate support point 18 of platform 12, while extension of pitch cylinder 40 is transmitted through truss 30 and A-frame 20 to elevate support point 14, and extension of roll cylinder 24 directly elevates support point 16.

Figure 2:
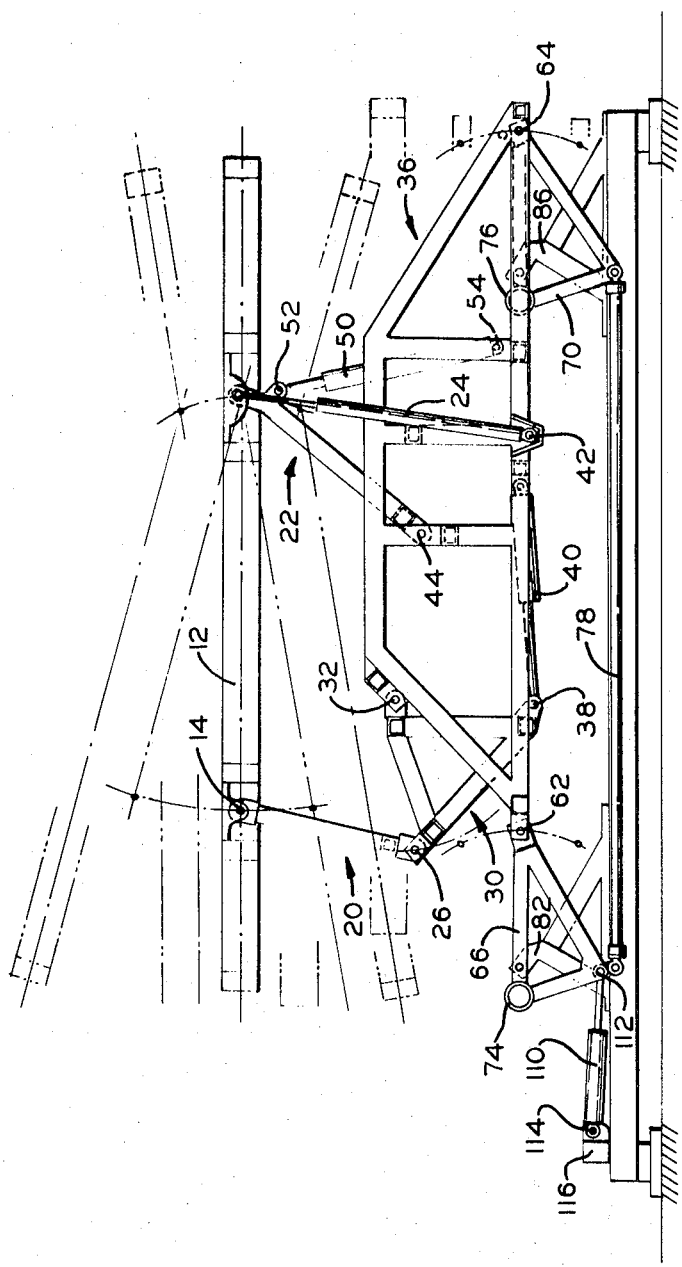
FIG. 2 is a side elevation, as in FIG. 1, showing the apparatus in an erected or operational position, with a number of possible positions of the motion platform shown in dot dash lines.
Figure 3:
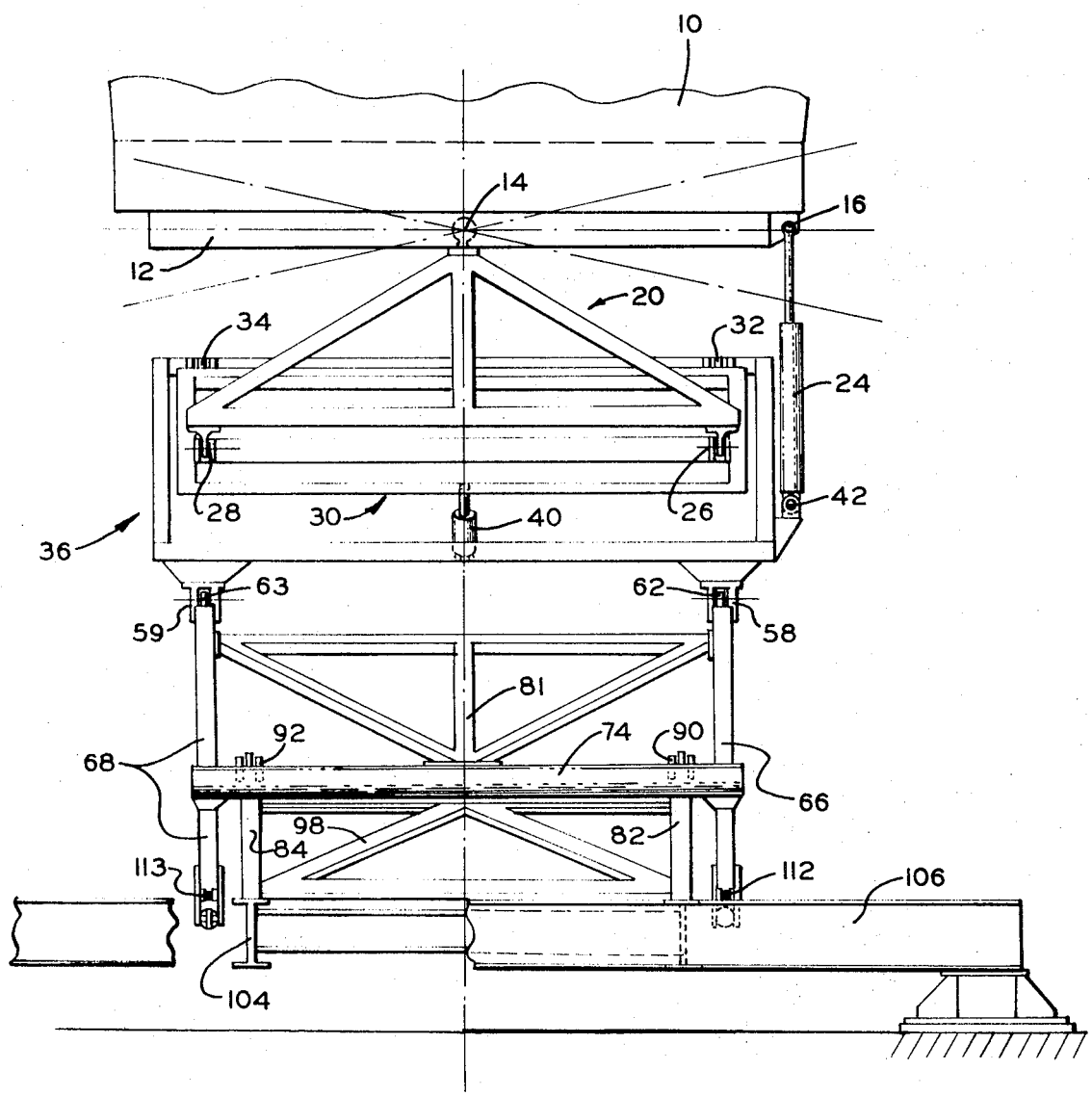
FIG. 3 is a front elevation of the apparatus of the invention shown in an elevated position.

Before commencing any controlled motion program for cockpit 10 vertical translation cylinders 110 and 111 would be extended from their fully retracted positions to an intermediate position from which both elevation and descent of platform 12 along the vertical axis could be achieved. As may be readily seen from the drawings, equal extension of cylinders 110 and 111 revolves all of bell cranks 66, 68, 70 and 72 an equal extent about their respective pivotal mountings in a counterclockwise direction as seen in FIGS. 1 and 2. Such rotation will directly elevate vertical translation truss 36, and thereby platform 12 and cockpit 10. Descent of the platform may be achieved by counter rotation of the bell cranks as cylinders 110 and 111 are retracted. The pivotal mounting of fixed ends 114 and 115 of cylinders 110 and 111 allows arcuate movement of the other ends about the pivotal mountings of the bell cranks on fixed mounts 82 and 84. Since the bell crank members which transmit movement of cylinders 110 and 111 to truss 36 are tied together to form a structurally closed-loop system, there is essentially no uneven backlash or lost motion in the vertical translation system from side to side or front to rear. Any unevenness in motion of cylinders 110 and 111, for example, due to leakage of fluid past a cylinder, will be compensated for by torsion tubes 74 and 76. This linkage also simplifies "ganging" of vertical translation actuators, such as cylinders 110 and 111 (and others, if desired), as well as the addition of balance cylinders connected to bell crank 70 and/or 72. Likewise, pitch and roll cylinders may be ganged, or balance cylinders added. Since ganged cylinders may be actuated with the same servo valve, the problems associated with synergistic actuators do not arise. It will be noted that although vertical motion of platform 12 may be implemented through simultaneous extension or retraction of erecting cylinder 50 and pitch and roll cylinders 40 and 24, such motion would require synergism of these three actuators, which is a feature specifically avoided by the present motion system.

It will also be readily apparent to those skilled in the art that motion in the other three axes of freedom, in addition to the three disclosed, may easily be added to the system. For example, translational motion along the X and Y axes of the entire apparatus, and thereby of cockpit 10, could be achieved by mounting the I-beams of the base section upon suitable rollers, air bearings, or the like. Rotation about a vertical axis through point 18 (i.e., yaw motion) may be achieved by mounting the support for the ball joint of A-frame 20 in a slider block laterally movable with respect to the remainder of platform 12 and mounting an actuating cylinder between the slider block and one side of the platform. A limited amount of fore-and-aft horizontal translation, sufficient for most purposes, may be achieved in a like manner by mounting the support for the ball joint of A-frame 22 in a slider block movable along the X axis and adding an actuator to effect such movement. Although support point 14 will move in a slight arc during such fore-and-aft motion, the ball joint of A-frame 20 would be near the top of the arc at all times with the illustrated geometry and any pitch motion would be imperceptible.

What is claimed is:

1. A motion simulator capable of providing controlled motion in any of several degrees of freedom to the student station of a vehicle trainer, or the like, said simulator comprising, in combination:
   (a) a first rigid support frame to which the student station is affixed for common movement;
   (b) a second rigid support frame to which said first frame is pivotally connected for movement in at least one rotational degree of freedom;
   (c) an immovable base relative to which said second frame is movable in at least one translational degree of freedom;
   (d) a first pair of bell crank members mounted for rotation about a common, fixed axis and each pivotally connected between said second frame and said base at one end and on opposite sides thereof;
   (e) a second pair of bell crank members mounted for rotation about a common, fixed axis and each pivotally connected between said second frame and said base on opposite sides and at the end thereof opposite said first pair;
   (f) first means extending laterally between said first pair of bell crank members and rigidly attached to each, whereby rotation of one of said first pair is transmitted to the other through said first means;
   (g) second means extending laterally between said second pair of bell crank members and rigidly attached to each, whereby rotation of one of said second pair is transmitted to the other through said second means;
   (h) first reciprocally movable motion actuator means connected between said first and second frames for imparting motion to said first frame relative to said second frame in said rotational degree of freedom; and
   (i) second reciprocally movable motion actuator means connected to one of said pairs of bell crank members to impart common rotational movement thereto, thereby imparting movement to said first and second frames relative to said base in said translational degree of freedom.

2. The invention according to claim 1 wherein said first and second means comprise torsion tubes welded to each of the respective bell cranks of said first and second pairs.

3. The invention according to claim 1 and further including third means extending between and pivotally connected to each of the bell crank members of opposite pairs on each side of said motion frame and base.

4. The invention according to claim 3 wherein said third means comprise tension rods through which rotation of any one of said bell crank members is transmitted directly to the bell crank members of the other pair.

References Cited

UNITED STATES PATENTS

| | | | |
|---|---|---|---|
| 711,098 | 10/1902 | Carr | 254—10 |
| 1,080,581 | 12/1913 | Preece | 254—10 |
| 2,637,449 | 5/1953 | Hamer | 214—1 |
| 2,787,842 | 4/1957 | Smith et al. | 35—12 |
| 2,788,193 | 4/1957 | Sanders et al. | 254—10 |
| 3,281,962 | 11/1966 | Pancoe | 35—12 |
| 3,304,628 | 2/1967 | Kaplan | 35—12 |
| 3,306,579 | 2/1967 | Campbell | 254—10 |
| 800,168 | 9/1905 | Morgan | 254—10.2 |
| 979,093 | 12/1910 | Porteous | 254—10.6 |
| 1,394,375 | 10/1921 | Torkildson | 254—10.4 |

ROBERT W. MITCHELL, Primary Examiner

L. R. OREMLUND, Assistant Examiner